United States Patent [19]

Irani

[11] 3,993,733

[45] Nov. 23, 1976

[54] FOOD GRADE ALKALI METAL PHOSPHATES FROM WET PROCESS $H_3PO_4$

[75] Inventor: Mazin R. Irani, Tarrytown, N.Y.

[73] Assignee: Stauffer Chemical Company, Westport, Conn.

[22] Filed: Aug. 14, 1975

[21] Appl. No.: 604,520

[52] U.S. Cl. .............................. 423/313; 423/321 S
[51] Int. Cl.² ................ C01B 15/16; C01B 25/26
[58] Field of Search ............... 423/305, 307–313, 423/321, 321 S, 490; 204/180 P

[56] References Cited

UNITED STATES PATENTS

| | | | |
|---|---|---|---|
| 2,044,940 | 6/1936 | Haag et al. ......................... | 423/321 |
| 2,970,098 | 1/1961 | Ellis .................................. | 204/180 P |
| 3,872,215 | 3/1975 | Cherdron et al. .................. | 423/309 |

FOREIGN PATENTS OR APPLICATIONS

| | | | |
|---|---|---|---|
| 1,284,404 | 12/1968 | Germany ........................... | 423/321 |
| 1,024,924 | 4/1966 | United Kingdom ................ | 423/321 |
| 467,843 | 6/1937 | United Kingdom ................ | 423/321 |

OTHER PUBLICATIONS

Ionics Bulletin, L–2, 1963, p. 3.

*Primary Examiner*—Oscar R. Vertiz
*Assistant Examiner*—Gregory A. Heller
*Attorney, Agent, or Firm*—Charles B. Rodman

[57] ABSTRACT

A process for converting wet process phosphoric acid to food grade alkali metal phosphates by a sequence of steps including extraction of the wet process acid, partial neutralization, dilution with water, contact with activated carbon, neutralization to a pH of from about 5 to about 9, contact with activated carbon, contact with insoluble alkaline earth metal phosphate salts and recovery of the dissolved alkali metal phosphate product in solution.

21 Claims, 1 Drawing Figure

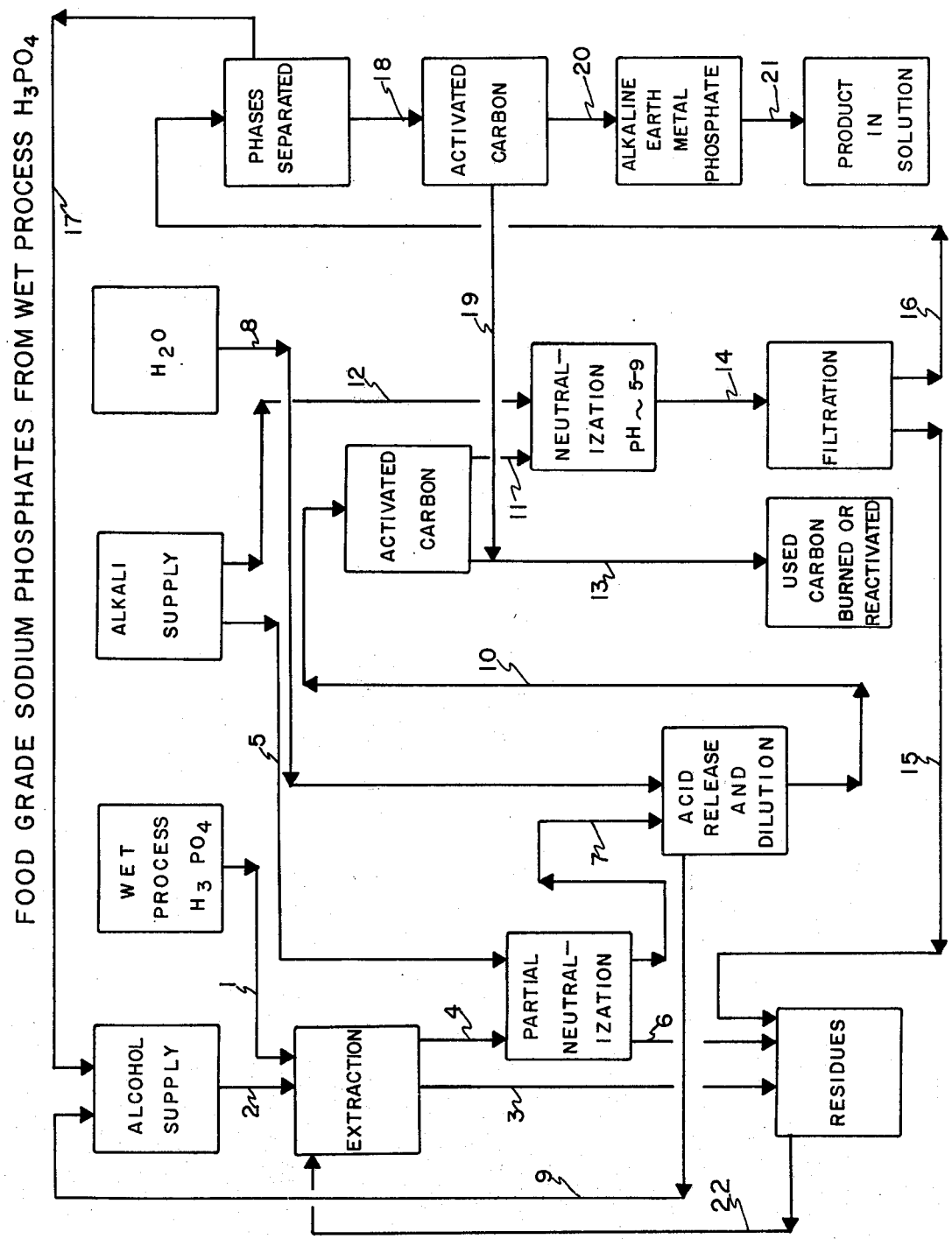

FOOD GRADE ALKALI METAL PHOSPHATES FROM WET PROCESS $H_3PO_4$

BACKGROUND OF THE INVENTION

The present invention relates to a process for producing food grade alkali metal phosphates from wet process phosphoric acid. The particular alkali metal phosphates encompassed by the present invention are monosodium phosphate ($NaH_2PO_4$), disodium phosphate ($Na_2HPO_4$), trisodium phosphate ($Na_3PO_4$) and mixtures thereof; monopotassium phosphate ($KH_2PO_4$), dipotassium phosphate ($K_2HPO_4$), tripotassium phosphate ($K_3PO_4$) and mixtures thereof; and monoammonium phosphate ($NH_4H_2PO_4$), diammonium phosphate [$(NH_4)_2HPO_4$] and mixtures thereof. These alkali metal phosphates, also referred to as orthophosphates, find considerable use in food and related industries wherein their purity must adhere to stringent requirements.

The Food Chemicals Codex, Second Edition, published by the National Academy of Science in Washington, D.C., 1972, has compiled a list of standards for Food Grade Chemicals that has been given official recognition by the Food & Drug Administration.

The limits of impurities for the food grade alkali metal phosphates are listed in the table below:

| | Maximum Impurity Limits[1] | | | |
|---|---|---|---|---|
| | Arsenic | Fluoride | Heavy Metals | Insolubles |
| | | | (as Pb) | |
| $NaH_2PO_4$ | 3 | 50 | 10 | 0.2% |
| $Na_2HPO_4$ | 3 | 50 | 10 | 0.2% |
| $Na_3PO_4$ | 3 | 50 | 10 | 0.2% |
| $KH_2PO_4$ | 3 | 10 | 20 | 0.2% |
| $K_2HPO_4$ | 3 | 10 | 20 | 0.2% |
| $K_3PO_4$ | 3 | 10 | 20 | 0.2% |
| $NH_4H_2PO_4$ | 3 | 10 | 10 | — |
| $(NH_4)_2HPO_4$ | 3 | 10 | 10 | — |

[1]Parts per million (ppm), unless otherwise specified.

In general, the primary method for producing food grade alkali metal phosphates occurs through a route beginning with the production of phosphoric acid via the "electric furnace" or "thermal acid" method well known in the art, and described in detail in Slack, Phosphoric Acid, Vol. 1, pages 927–966, Marcel Dekker, Inc. (1968), and Waggaman, Phosphoric Acid, Phosphates and Phosphatic Ferilizers, pages 158–173, Hafner Publishing Co. (2nd Edition, 1969).

The mono- and disodium phosphates are usually made from phosphoric acid and soda ash. In some plants soda ash is continuously mixed with the acid in such proportions as to keep the composition at that corresponding to disodium phosphate. Part of the resulting slurry is then cut back with acid to form monosodium phosphate. Trisodium phosphate is made by adding caustic soda to the disodium phosphate slurry. The trisodium composition cannot be reached with soda ash alone, and some caustic (about two-thirds, or more, of one equivalent or two-ninths, or more, of the total sodium) must be used. Conversion to sodium polyphosphates is generally accomplished using the sodium orthophosphates as a starting point, and is well known in the art.

The manufacture of food grade alkali metal phosphates wherein the thermal method for producing phosphoric acid is utilized, requires relatively expensive capital equipment, large amounts of electrical energy and pollution control. Because of the wide gap between the price of wet process phosphoric acid and the price of electrothermal acid made from elemental phosphorus, production of food grade alkali metal phosphates from wet process phosphoric acid has received increasing attention.

The production of "wet process" phosphoric acid by the treatment of phosphate rock with sulfuric acid is well known in the art and is described, for example, in Waggaman, Phosphoric Acid, Phosphates and Phosphatic Fertilizers, pages 174–209, Hafner Publishing Company (2nd Edition, 1969). The production of wet process phosphoric acid by the treatment of phosphate rock with acids other than sulfuric acid, such as hydrochloric acid and nitric acid is also well known in the art and is described in Slack, Phosphoric Acid, Volume 1, Part 2, pages 889–926, Marcel Dekker, Inc. (1968).

Regardless of what acid is used to produce the wet process phosphoric acid, a considerable amount of dissolved and suspended impurities such as silica, aluminum, magnesium, vanadium, fluorine, chlorine, calcium, arsenic, lead, iron and other organic and inorganic impurities are contained in the acid. The resulting wet process phosphoric acid contaminated by the aforesaid impurities has relatively limited use, primarily in the fertilizer industry where such impurities are not only not harmful but may be considered a desirable source of trace elements.

The prior art does contain methods for purifying wet process phosphoric acid, however, these methods are not entirely satisfactory, primarily due to the fact that they do not produce phosphoric acid as pure as that produced by the well known thermal process. Alkali metal phosphates produced from this acid would, therefore, retain these impurities. In addition, these prior art processes are costly and tedious, and, because of certain steps such as centrifugation, distillation, etc., which require large amounts of energy and costly equipment, these processes are not economical.

It has, therefore, been an objective of the industry to provide an efficient, economical method for purifying wet process phosphoric acid in order to obtain a product that can be used to produce food grade alkali metal phosphates.

The present invention has achieved an efficient and commercially economical method for producing food grade alkali metal phosphates from wet process phosphoric acid. It is characterized by high yields, it is not energy dependent and is simple in operation. In addition, all materials used can generally be reused after conditioning.

DESCRIPTION OF THE PREFERRED EMBODIMENT

In accordance with the present invention, wet process phosphoric acid having a concentration of from about 40% to about 64% $P_2O_5$, is converted to food grade alkali metal phosphates by a sequence of steps including extraction of the wet process acid, partial neutralization, dilution with water, contact with activated carbon, neutralization to a pH of from about 5 to about 9, contact with activated carbon, contact with an insoluble alkaline earth metal phosphate salt and recovery of the dissolved alkali metal phosphate product in solution.

Another advantage of the process of the present invention is its versatility in producing food grade alkali metal phosphates from wet process phosphoric acid produced from either calcined or uncalcined rock. Phosphoric acid prepared from uncalcined phosphate rock (black acid) generally has an organic carbon content of from about 0.1 to about 0.6%, with an average of about 0.3%, by weight. Calcination of the phosphate rock decreases its organic carbon content. It has been found that these organic impurities are soluble in the solvents used in the process of the present invention.

Organic solvents suitable for extracting wet process phosphoric acid from the aqueous reaction mixture are those that are capable of dissolving concentrated phosphoric acid but which have limited miscibility with water, with or without dissolved phosphoric acid.

A representation of solvents suitable for the process of the present invention can be ascertained by reference to data on the mutual miscibility of solvents and water, which is well known in the art and available from the literature, e.g., Seidell, *Solubilities of Organic Compounds*, 3rd Edition, Volume 2 (1941), D. Van Nostrand Co., Inc., New York, N.Y.

Particular solvents within the above definition are, for example, lower aliphatic alcohols ethers, esters and the ketones of limited mutual miscibility with water, such as alcohols, including cyclic alcohols, used alone or in mixtures, and trialkyl phosphates, particularly those containing 2 to 8 carbon atoms in the individual alkyl groups, such as tributyl phosphate and mixtures thereof.

Where an alcohol is used to contact the wet process phosphoric acid in the initial extraction step, it is preferred to employ an alcohol which contains from 5 to 8 carbon atoms. Alcohols containing 4 carbon atoms such as butyl alcohol can also be used, but their use requires a subsequent upgrading operation for purposes of recycling and reuse. This upgrading operation involves drying, ion exchange, distillation or a combination of the above. On the other hand, alcohols having more than 8 carbon atoms are too viscous and economically impractical to use.

Examples of alcohols containing 5 to 8 carbon atoms suitable for use in the present invention are isoamyl, amyl or n-pentyl, 2 methyl-1-butanol, hexanol, heptanol, octanol, their isomers, and mixtures of the aforesaid alcohols.

The solvent-to-acid weight ratio used in contacting the alcohol with the wet process acid may be varied within the range of from about 4 to 1 to about 1 to 2. It is preferable to operate in the range of about 3 to 1 to about 1 to 1. Most preferable is a weight ratio of about 2 to 1.

The preferred ratios are dictated by a balancing of two opposing effects. Thus, when the relative amount of solvent employed is decreased, the concentration of the acid after stripping with water is increased. This is of course desirable. However, countering this effect, less $P_2O_5$ values are extracted from the feed acid. Therefore, although the $P_2O_5$ concentration of the final stripped product is greater, the total recovery of $P_2O_5$ values would be decreased.

Additionally, the solvent-to-acid ratio has a pronounced effect on the level of impurity rejection. For example, using n-heptanol as the solvent and a 55.7% $P_2O_5$ wet process phosphoric acid, and holding the other variables constant while changing the solvent to acid weight ratio from 2 to 1 to 1 to 2, reduces the amount of $P_2O_5$ extracted respectively, from 72 to 48% in a single stage extraction. The corresponding impurity rejection is decreased from 64 to 49% for Fe, 68 to 66% for Al and 96 to 85% for Mg.

The impurities removed during the alcohol-acid contacting step include silica, metal phosphates and gypsum, along with some acid. It is to be understood that the term "removal of impurities" as used in the context of this invention, does not necessarily imply total removal.

The contacting of the acid with the alcohol in the extraction step generally occurs at temperatures ranging from about 40° to about 150° F., preferably at about 70° to about 120° F.

In the partial neutralization step, an alkaline reagent is used to partially neutralize the phosphoric acid. The alkaline reagent is added in slight excess of the amount necessary to precipitate metal impurities such as sulfates, and fluorosilicates.

In general, it is preferred that an alkali metal hydroxide or carbonate, or ammonia be used, however, the particular alkali mtal cation used throughout the process should be consistent. Thus concentrated sodium hydroxide, dry sodium carbonate or mixtures thereof can be used. The amount of alkaline reagent employed in the partial neutralization step can vary from about 1 to about 10%, preferably from about 3 to about 7% by weight of the total $P_2O_5$ in the starting acid.

The partially neutralized phosphoric acid is then stripped from the alcohol by dilution with water. This separates the alcohol from the acid. The amount of water used in the dilution or stripping operation is dictated by the concentration of acid in the alcohol-solvent phase, but is generally that amount which will yield an acid having a concentration varying from about 5 to about 30% $P_2O_5$.

The alcohol that is separated can then be recycled to the alcohol supply. Diluting the acid to a lower concentration is advantageous in that it lowers its viscosity, makes it easier to work with in the subsequent purification steps and reduces the acid's ability to damage operating equipment.

In general, the partially neutralized acid-to-water weight ratio used in the stripping or dilution step can be varied within the range of about 1 to 1 and about 10 to 1 depending upon the number of stripping stages. A ratio should be chosen which will result in stripping about 90% of the $P_2O_5$ from the alcohol-solvent phase to the aqueous phase. For one, two, or three stage stripping, the preferred ratios are about 2 to 1, 5.5 to 1, and about 6.5 – 7.5 to 1, respectively.

The stripping or dilution step of the process may be carried out at temperatures of from about 40° to about 150° F., preferably about 70° to about 120° F.

In a preferred embodiment of the process, the partially neutralized acid and water phases are mixed for a period of about 2 to about 15 minutes, most preferably from about 5 to about 10 minutes and then allowed to settle for a period of from about 20 to about 90 minutes.

The diluted phosphoric acid, after separating any suspended particles is contacted with activated carbon. The purpose of the activated carbon contacting step is to remove high molecular weight organic matter such as fatty acids and sulfonic acids which can cause frothing during subsequent purification steps. This high moleclar weight organic material is generally present in the uncalcined phosphate rock, and is carried over into the wet process acid. In some cases organic material is also carried over from calcined phosphate rock.

As a general rule, this activated carbon contacting step can be eliminated where the high molecular weight organic content constitutes less than 0.08 weight percent, and most preferably, less than 0.04 weight percent.

The activated carbon used to contact the acid can be in the form of a column wherein the acid is passed through, or alternatively, particles of activated carbon can be mixed directly with the acid. When activated carbon particles are mixed directly with the phosphoric acid, they must be separated by either screening, filtration, centrifugation, and the like, before proceeding further.

Recommended flow rates, when operating with a column of activated carbon can vary from about 5 to about 50 milliliters of acid per minute per square inch of column at ambient conditions. Operating at a flow rate of about 15 milliliters per minute per square inch of column is especially preferred. In general, operating at higher temperatures, such as about 60° C. increases the efficiency.

The phosphoric acid is next neutralized to a pH varying between about 5 and about 9, preferably about 6 to about 8, thereby producing a phosphate salt solution.

The purpose of the neutralization step is to produce soluble phosphate salts which stay in solution and which will precipitate undesirable metal salts such as zinc, cadmium, nickel, vanadium, copper, aluminum, magnesium, and the like, in the form of phosphates, carbonates, and hydrated oxides. An additional purpose of the neutralization step is to allow the use of activated carbon in a subsequent step in a manner wherein it will operate most effectively, i.e., in a close to or neutral solution.

In general, the phosphoric acid neutralization can be accomplished in at least three ways. The first approach for neutralizing the phosphoric acid is accomplished by contacting with an alkali such as sodium hydroxide, sodium carbonate, sodium bicarbonate, potassium hydroxide, potassium carbonate, potassium bicarbonate, ammonia, ammonium hydroxide, ammonium carbonate, ammonium bicarbonate and other equivalent alkalis in amounts sufficient to produce a soluble alkali phosphate in the desired pH range. Anion mixtures of the individual alkali cations can also be used.

The alkali phosphate solution can be a mixture of mono- and dialkali phosphates, with their existence and ratio dependent upon the particular pH reached. For example, when an alkali such as sodium carbonate, sodium hydroxide, or mixtures thereof is used to reach a pH of 6.55 at an original $P_2O_5$ concentration of 25%, this will result in a molar ratio of mono- to disodium phosphate of about 1:2.

The crude phosphoric acid can also be neutralized to the proper pH by contacting it with a sodium, potassium, or ammonium-loaded ion exchange resin to raise the pH to form a solution of alkali phosphate salts. The particular alkali cation is chosen in accordance with the alkali phosphate desired.

The contacting of the phosphoric acid with the alkali metal loaded ion exchange resin can occur in a column, or the ion exchange resin particles can be admixed directly with the phosphate salt solution. If direct admixture of of ion exchange resin particles is chosen, then a separation operation is necessary to remove the resin particles before further treatment of the phosphate salt solution can occur. This can be conveniently accomplished by screening, filtration, centrifugation, and the like.

During the contacting of the phosphoric acid with the alkali metal loaded ion exchange resin, hydrogen ions from the phosphoric acid replace the alkali metal ions on the resin, thereby converting it from the alkali metal form to a hydrogen loaded form.

Alternatively, neutralization of the phosphoric acid can be accomplished with electrodialysis. The phosphoric acid is placed in a chamber wherein electrolytes are transferred through an ion-selective semi-permeable membrane to accomplish the neutralization by means of electrical energy. This procedure is well known and described, for example, in Kirk-Othmer's *Encyclopedia of Chemical Technology*, 2nd Edition, Vol. 7, at pages 846–865 (Interscience 1963).

The undesirable metal salts which have precipitated during the neutralization step are separated by screening, filtration, centrifugation, or other equivalent means. The resulting phosphate solution is then contacted with activated carbon, or by direct admixture with activated carbon particles. The purpose of this activated carbon step is to remove high molecular weight organic material that has a tendency to impart an undesirable gray or brown color.

Recommended flow rates, when operating with a column of activated carbon can vary from about 5 to about 50 milliliters of acid per minute per square inch of column at ambient conditions. Operating at a flow rate of about 15 milliliters per minute per square inch of column is especially preferred. In general, operating at higher temperatures, such as about 60° C increases the column efficiency.

The resulting phosphate salt solution is now at a technical grade level and can be used for whatever purpose desired. For example, where the phosphate salt solution comprises mixed sodium phosphates, they can then be used for conversion to sodium tripolyphosphate in a manner well known in the art. However, where the objective is to produce food grade alkali metal phosphates, the phosphate salt solution must undergo further processing steps.

The alkali phosphate salt solution is then contacted with an insoluble alkaline earth metal phosphate having an alkaline earth metal to phosphorus mole ratio of about 1.4:1 to about 1.8:1. The preferred alkaline earth metals are calcium and magnesium, with calcium being particularly preferred. The calcium phosphates include hydroxy apatite, tricalcium phosphate and mixtures thereof. The analagous magnesium phosphate salts can also be used, and mixtures of both calcium and magnesium salts also function.

An example of an insoluble calcium phosphate salt suitable for use in the present invention is pure hydroxy apatite prepared and used in accordance with the article "Removal of Fluorides from Potable Water by Tricalcium Phosphate," by Adler et al, Volume 30, Industrial & Engineering Chemistry, pages 163–165 (1938).

Flow rates and contact times depend upon the amount of fluorine present in the solution and the level of fluorine desired in the product. For example, about 10 to about 150 parts per million of fluorine will require about 1 to about 50% tricalcium phosphate, by weight, with about 5 to about 20% tricalcium phosphate being preferred. Contacting times can last for about 1 to about 100 minutes, with about 5 to about 30 minutes being preferred.

The alkali phosphate salt solution after contact with the alkaline earth metal phosphate is now in its product state and sufficiently pure for food grade application. In general, it can be concentrated and crystallized by heating to dryness at a temperature under 250° C.

The alkaline earth metal phosphates, after use can be separated from the alkali phosphate solution by any convenient means, such as screening, filtration, centrifugation and other equivalent means. The separated alkaline earth metal phosphates can be conveniently regenerated by contacting with a dilute caustic solution, such as 5% NaOH for about one-half hour, separated from the caustic by screening, filtration or centrifugation, and suspended in water. A sufficient amount of an acid is added to the suspension to reach a pH of 7. Acids such as HCl, $H_2SO_4$, $H_3PO_4$, and $HNO_3$ can be conveniently used. For best results, the acids are usually diluted to a concentration of about 5 to about 10%. The neutral suspension of alkaline earth metal phosphate is separated, worked with water, and is ready for reuse.

The process will now be described with reference to the attached FIGURE which is a schematic flow plan of the process. Wet process phosphoric acid from Stream 1 is contacted with an alcohol of from about 5 to about 8 carbon atoms flowing through Stream 2 into an extraction unit. The residue phase exiting at Stream 3 is semi-liquid/semi-solid in composition and contains silica, metal phosphates, gypsum and some phosphoric acid. Stream 3 is conveniently collected in a residue collection area, wherein the residues may be further processed and the useful values recovered. The alcohol-acid extract phase exiting at Stream 4 is partially neutralized by the addition of a sufficient amount of a concentrated alkali passing through Stream 5 into the partial neutralization unit to precipitate metal impurities including iron, aluminum, magnesium, calcium and heavy metals, which are then separated in Stream 6, which passes to the residue collection area. The partially neutralized alcohol-acid extract in Stream 7, free of most metal impurities and other residues is then contacted with water from Stream 8 to form an aqueous phosphoric acid phase and an alcohol phase. The resulting phosphoric acid phase can also contain a small amount of dissolved alcohol. The separated alcohol phase is recycled through Stream 9 to the alcohol supply, and the aqueous phosphoric acid phase exists in Stream 10 for treatment by contacting with activated carbon. The activated carbon treatment removes high molecular weight organic impurities, and can be omitted where the high molecular weight organic content is less than 0.08% in the original acid.

The phosphoric acid exits the activated carbon treatment in Stream 11 and is contacted with a concentrated alkali from Stream 12, which raises the pH to between about 5 and about 9, thereby forming a mixed alkali phosphate solution. The neutralization step can also be accomplished by means of an ion exchange resin or electrodialysis, as described earlier. The spent carbon from the activated carbon treatment exits through Stream 13 to a reactivation zone or is burned. The solution of alkali phosphates along with insoluble impurities proceeds in Stream 14 to a filtration step wherein insoluble impurities are removed and exits via Stream 15 to the residue collection area. These impurities include metal phosphates and other insoluble material. The clear filtrate containing the alkali phosphate solution exits the filtration step at Stream 16 and contains an alkali phosphate solution phase and possibly some alcohol which, if present, appears in a separate alcohol phase. The alcohol phase is separated and recycled through Stream 17 to the alcohol supply. The alcohol-free alkali phosphate solution proceeds through Stream 18 to another activated carbon treatment. The contacting of the alkali phosphate solution with the activated carbon serves to remove any final traces of organics along with any remaining alcohol. The spent activated carbon exits via Stream 19 to be reactivated or burned. The alkali phosphate solution exits through Stream 20 and is contacted with an insoluble alkaline earth metal phosphate salt, which serves to remove any remaining soluble fluorine ions. Th alkali phosphate solution exiting Stream 21 complies with food grade alkali phosphate specifications. primarily phosphoric acid and can be recycled to the extraction unit via Stream 22.

The following examples more particularly illustrate the invention. All parts and percentages are by weight unless otherwise noted.

EXAMPLE 1

500 gms of a wet process phosphoric acid containing 54% $P_2O_5$, 5.29% $SO_3$, 0.02% organic matter, 0.65% Fe, 0.94% Mg, 0.54% Al, 25 ppm Ca and 0.37% F were extracted with 1000 grams of isoamyl alcohol producing an alcohol-acid phase I and an aqueous raffinate phase II. The phases were separated. Phase I was contacted with 15.5 grams of a 50% NaOH solution. A phase separation resulted in the formation of an alcohol-acid phase III and an aqueous phase IV containing precipitated impurities. Phases III and IV were separated. 580 ml. of water was added to phase III. Two phases appeared: An alcohol phase V and an aqueous-acidic phase VI. The alcohol phase V was recycled into step one above. Solution VI was passed over an activated carbon column (4 ft × 2 in) at a rate of 50 ml/min. The resulting solution VII was reacted with 50% caustic soda to reach a pH of 7.5. A greenish-gray precipitate VIII containing metal impurities was formed and filtered, leaving a water white solution IX of mono- and disodium phosphate.

Precipitate VIII, aqueous phase IV (with the precipitate in it) and raffinate phase II were combined to form phase X. The supernatant liquid XI from phase X was recycled into the first extraction step. Solution IX was passed over an activated carbon column, and contacted with an insoluble calcium phosphate salt and filtered, yielding a filtrate solution XII containing a 1:3 mole ratio of mono- and disodium phosphate solution. The pH of solution XII was adjusted by a 50% caustic soda solution to give an Na/P mole ratio of 2:1. The resulting solution XIII was concentrated by heating to start the precipitation of disodium hydrogen phosphate. The yield of disodium hydrogen phosphate was over 80% of the $P_2O_5$ present in the starting material. The disodium hydrogen phosphate product contained 1.2 ppm Pb, 1.4 ppm As, 4 ppm F, 6 ppm Fe, 11 ppm Ca, less than 10 ppm $SO_3$, less than 5 ppm Mg and less than 5 ppm total organic matter.

EXAMPLE 2

300 grams of a wet process phosphoric acid containing 54% $P_2O_5$, 6.5% $SO_3$, 0.24% organic matter, 0.37% Fe, 0.12% Mg, 0.46% Al, 41 ppm Ca and 0.96% F were extracted with 600 grams of isoamyl alcohol to produce an alcohol-acid phase I and an aqueous raffinate phase II. The phases were separated. Phase I was contacted with 4.6 grams of a 50% NaOH solution. A phase separation resulted in the formation of an alcohol-acid phase III and an aqueous phase IV containing precipitated impurities, including sodium fluosilicate, sodium sulfate and inorganic metal salts. Phases III and IV were separated. 370 ml of water was added to Phase III. Two phases appeared: An alcohol phase V and an aqueous acidic phase VI. The alcohol phase V was recycled into step 1 above. Solution VI was passed over an activated carbon column (4 ft × 2 in) at a rate of 50 ml/min. The resulting solution VII was reacted with 50% caustic soda to reach a pH of 7.5. A greenish-gray precipitate VIII containing metal impurities was formed and filtered, leaving a water white solution IX of mono- and disodium phosphate.

Precipitate VIII, aqueous phase IV (with the precipitate in it) and raffinate phase II were combined to form phase X. The supernatant liquid XI, from phase X, was recycled into the first extraction step. Solution IX was passed over an activated carbon column, contacted with an insoluble calcium phosphate salt and filtered, yielding a filtrate solution XII containing a 1:3 mole ratio of mono- and disodium phosphate.

The pH of solution XII was adjusted by a 50% caustic soda solution to give an Na/P mole ratio of 2:1. The resulting solution XIII was concentrated by heating to start the precipitation of the disodium hydrogen phosphate. The yield of disodium hydrogen phosphate was over 80% of the $P_2O_5$ present in the starting material. The product contained 1.3 ppm Pb, 1.2 ppm As, 4.8 ppm F, 5.2 ppm Fe, 14 ppm Ca, less than 10 ppm $SO_3$, less than 5 ppm Mg, less than 5 ppm organic matter, and less than 5 ppm Al.

What is claimed is:

1. A process for the preparation of high purity alkali phosphate solutions from wet process phosphoric acid which comprises:
   a. contacting a wet process phosphoric acid with an organic solvent capable of extracting said acid to form a solvent-acid phase, and a raffinate phase;
   b. partially neutralizing the solvent-acid phase by contacting with a concentrated alkali in amounts sufficient to precipitate impurities, and separating said impurities;
   c. diluting said partially neutralized solvent-acid phase with water to strip a dilute aqueous phosphoric acid phase from said solvent phase, and separating said phosphoric acid phase;
   d. neutralizing the aqueous phosphoric acid to a pH of between about 5 and about 9, thereby forming a solution of soluble salts of phosphoric acid and a precipitate, and separating said precipitate;
   e. contacting said solution of soluble salts with activated carbon;
   f. contacting said solution of soluble salts with an insoluble alkaline earth metal phosphate salt and separating said insoluble salt to thereby produce a high purity alkali phosphate solution.

2. The process of claim 1, step (a), wherein said solvent is an alcohol containing 5 to 8 carbon atoms.

3. The process of claim 1, step (a), wherein the raffinate phase is separated prior to partial neutralization.

4. The process of claim 1, step (b), wherein said alkali is selected from the group consisting of sodium hydroxide, sodium carbonate, and mixtures thereof; potassium hydroxide, potassium carbonate, and mixtures thereof; ammonia, ammonium hydroxide, ammonium carbonate, and mixtures thereof.

5. The process of claim 4 wherein said alkali is selected from the group consisting of sodium hydroxide, sodium carbonate and mixtures thereof.

6. The process of claim 1, step (c), wherein said aqueous phosphoric acid phase, after separating said solvent phase, is contacted with activated carbon.

7. The process of claim 1, step (d) wherein said neutralization is accomplished by contacting said acid wih an alkali selected from the group consisting of sodium hydroxide, sodium carbonate, sodium bicarbonate, and mixtures thereof; potassium hydroxide, potassium carbonate, potassium bicarbonate, and mixtures thereof; ammonia, ammonium hydroxide, ammonium bicarbonate, ammonium carbonate, and mixtures thereof.

8. The process of claim 7 wherein said alkali is selected from the group consisting of sodium hydroxide, sodium carbonate, sodium bicarbonate and mixtures thereof.

9. The process of claim 1, step (d) wherein said neutralization is accomplished by contacting said acid with an ion exchange resin loaded with an alkali metal cation selected from the group consisting of sodium, potassium, and ammonium.

10. The process of claim 1, step (d), wherein said pH varies from about 6 to about 8.

11. The process of claim 1, step (d) wherein said neutralization is accomplished by means of electrodialysis.

12. The process of claim 1, step (f), wherein said alkaline earth metal phosphate salt is selected from the group consisting of calcium, magnesium and mixtures thereof.

13. The process of claim 12 wherein said insoluble alkaline earth metal phosphate salt has an alkaline earth metal to phosphorus mole ratio varying from about 1.4:1 to about 1.8:1.

14. The process of claim 13 wherein said alkaline earth metal phosphate is a calcium salt selected from the group consisting of hydroxy apatite, tricalcium phosphate, and mixtures thereof.

15. The process of claim 1 wherein the supernatant liquid from the residues of steps (a), (b), and (d) is recycled to the solvent-acid contacting.

16. The process of claim 1, step (d), wherein said soluble salts undergo a phase separation prior to the activated carbon contacting.

17. The process of claim 1, step (d) wherein said acid has been diluted to a concentration varying from about 5% to about 30% $P_2O_5$.

18. The process of claim 1, step (c), wherein said solvent phase is recycled to the solvent supply.

19. The process of claim 2 wherein said solvent is selected from the group consisting of amyl alcohol, 2-methyl-1-butanol, hexanol, heptanol, octanol, isomers, and mixtures thereof.

20. The process of claim 1, step (d), wherein said pH varies from about 6 to about 8.

21. The process of claim 1 wherein said alkali phosphate solution complies with food grade requirements.

* * * * *

UNITED STATES PATENT AND TRADEMARK OFFICE
CERTIFICATE OF CORRECTION

PATENT NO. : 3,993,733
DATED : November 23, 1976
INVENTOR(S) : Mazin R. Irani

It is certified that error appears in the above-identified patent and that said Letters Patent are hereby corrected as shown below:

Col. 2, line 13, the words "wet process" should be set off in quotation marks as noted herein.
Col. 4, line 20, the word "mtal" should be changed to --metal--.
Col. 4, line 65, the word "moleclar" should be changed to --molecular--.

Col. 8, line 14, change "Th" to --The--.
Col. 8, line 16, after the word "specifications." insert the following words --Any supernatant liquid in the residue collection area is --.

Signed and Sealed this ninth Day of August 1977

[SEAL]

Attest:

RUTH C. MASON
Attesting Officer

C. MARSHALL DANN
Commissioner of Patents and Trademarks